March 25, 1969  J. J. KENT, JR  3,434,713
METHOD OF AND SYSTEM FOR STAGING PRODUCTIONS
Filed Dec. 14, 1964  Sheet 1 of 3

INVENTOR.
JAMES J. KENT, JR.
BY
Attorney

INVENTOR.
JAMES J. KENT, JR
BY
Attorney

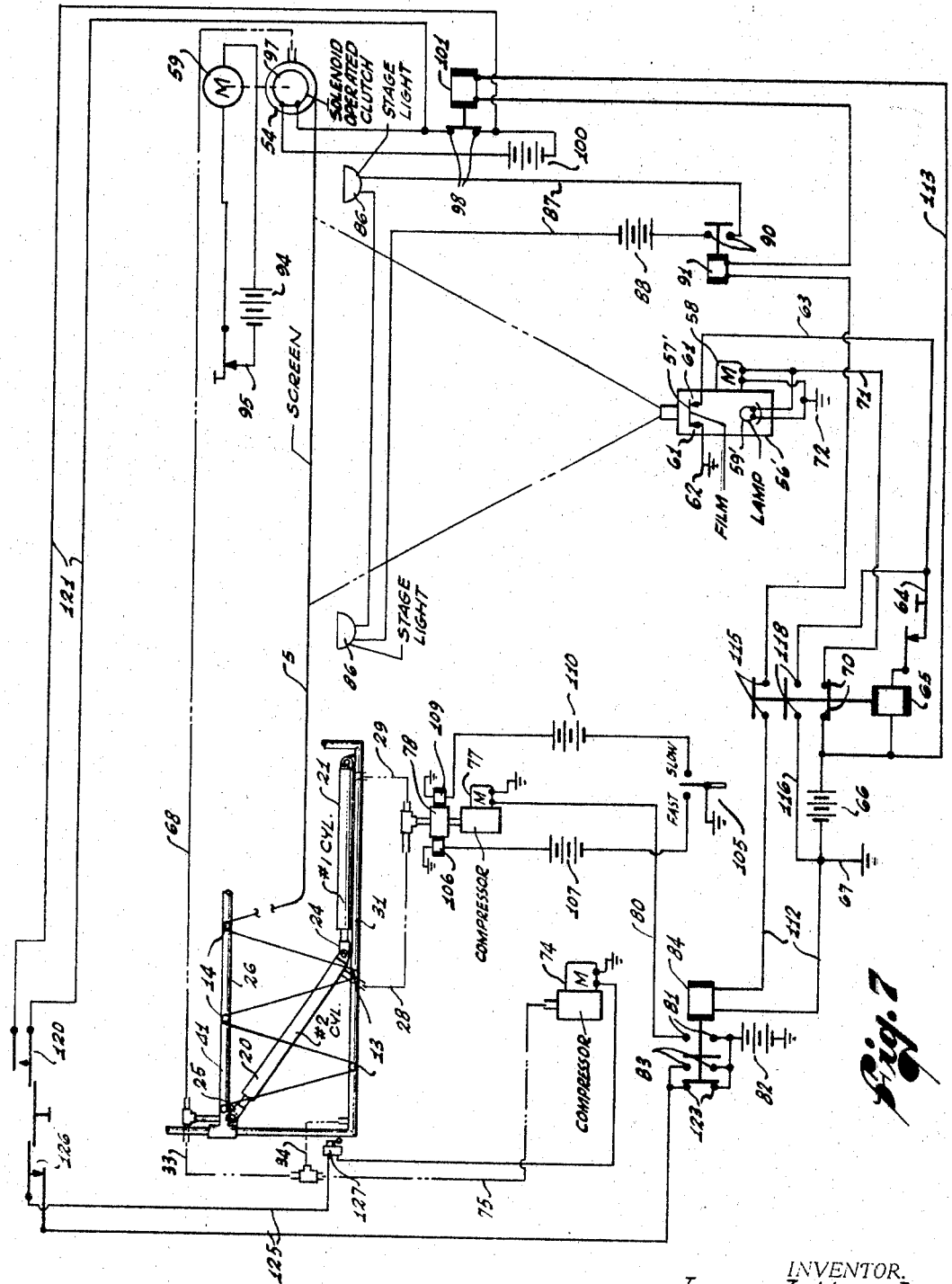

United States Patent Office 3,434,713
Patented Mar. 25, 1969

3,434,713
METHOD OF AND SYSTEM FOR STAGING PRODUCTIONS
James J. Kent, Jr., Glendora, Calif., assignor to 4-D Productions, Pasadena, Calif., a partnership
Filed Dec. 14, 1964, Ser. No. 418,025
Int. Cl. A63g 5/00, 3/00
U.S. Cl. 272—10         11 Claims

ABSTRACT OF THE DISCLOSURE

A system for presenting alternately viewed live and filmed scenes including a projection system having a projection screen with opaque and see-through sections, and means for rapidly moving the screen edgewise to selectively locate the sections in viewing position, in such manner as to permit alternate projection of a filmed scene onto the opaque screen section and exposure of a live scene through the see-through screen section.

---

This invention relates to the presentation of scenes, both picture and live, in a serial order, such as picture-to-live, and vice versa, and particularly to a method of and system for providing viewers with an intermingling of picture and live scenes to enhance the depicting of stories for entertainment, education, and documentation.

It is realized that transitions or dissolve illusions between motion picture action and live action are known, as evidenced by U.S. Patents Nos. 3,035,836, of May 22, 1962, 3,084,933, of Apr. 9, 1963, and 3,085,799, of Apr. 16, 1963. These prior systems, however, only provide certain types of illusions but not the rapid transition, dissolve, or intermingling of pictorial and live actions possible with this invention.

The present invention is one which automatically provides a transition or "transmergence" from motion picture screen action to live action during which the picture scene may be replaced by a live scene. The transition is made in an extremely short interval of time, such as 1/25 of a second, which is comparable to the pull-down period of the film being projected so that the observers are practically unaware of the change until the live actors move about the stage and speak. Although the transition back from live action to picture action may be at a slower rate, it is accomplished with sufficient rapidity so that observers are again substantially unaware of the change.

In copending application, Ser. No. 342,693, filed Feb. 5, 1964 and now Patent No. 3,259,386, a system for obtaining the general results mentioned above is disclosed and claimed. In this prior application, one method of and system for removing and replacing the screen in observation position is described along with a control circuit. The present invention is directed to a method of and system for more rapidly removing the observation screen and replacing it in observation position, the system including controls for varying the speed of removal of the screen to accomplish certain effects being referred to in the prior application as "transmergence." The present system reduces the space required for removing the screen and obtains the motion with substantially no friction, since the screen rides on air bearings. These results are accomplished by interleaving two arrays of supporting standards around which the screen passes, one array of standards being rapidly moved transversely to the plane of the screen. In this manner, the results mentioned in the above-identified application are improved and more economically produced.

The principal object of the invention, therefore, is to facilitate the transition between pictorial and live action scenes.

Another object of the invention is to provide an improved method of and system for rapidly transmerging a scene from picture action to live action, and vice versa.

A further object of the invention is to provide apparatus which will automatically control the transition between picture and live actions.

A still further object of the invention is to provide a method of and system for rapid screen movement which is substantially frictionless and which may be controlled as to speed of removal.

A better understanding of this invention may be had from the following detailed description when read in conjunction with the accompanying drawings, in which:

FIG. 7 is a combination diagrammatic and schematic circuit diagram embodying the invention.

Figure 1:
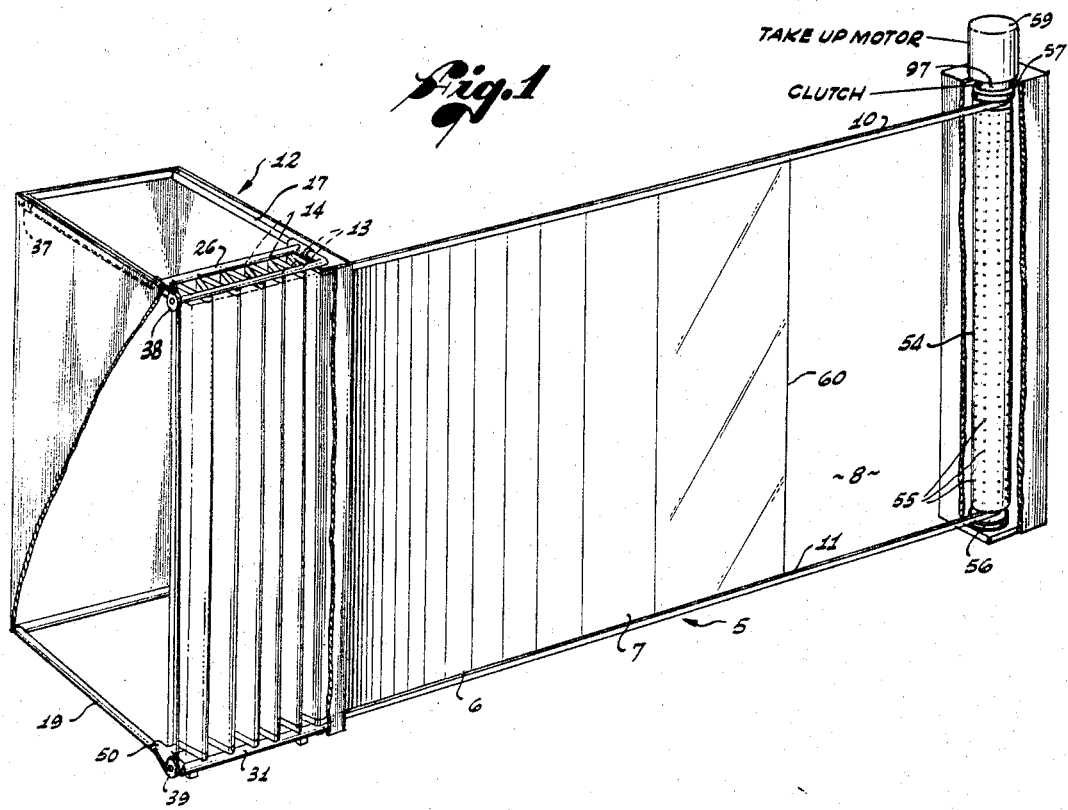
FIG. 1 is a diagrammatic perspective view of the screen removal and replacement system embodying the invention.
Figure 2:
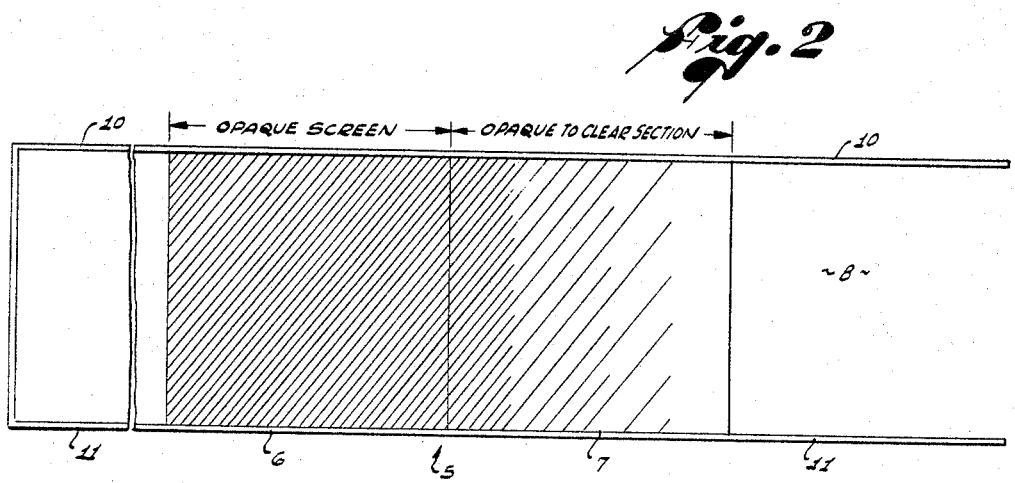
FIG. 2 is a developed view of the screen used in the invention.

Referring, now, to the drawings in which the same numeral identifies the same element, a screen 5 has three sections, namely, an opaque screen section 6 of uniform opacity, a section 7 having a variable opacity from section 6 to section 8, which is either completely transparent or has no screen at all. The edges of the screen, such as 10 and 11, are fibre glass bands to which the edges of the screen are attached and which serve as cords for the section 8 of the screen 5 when the section 8 does not have a clear section.

As shown in the drawings, a rectangular framework is made up of outer frame sections of any suitable type and in which is an array of standards, one group, such as 13, being fixed, and another group 14 being movable along upper longitudinal members 16 and 17 and longitudinal members 19 and 23. These standards may be enclosed within a cabinet 12.

Figure 5:
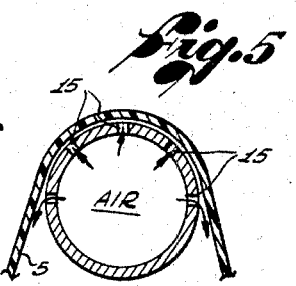
FIG. 5 is a detail view of the frictionless standards.

The screen 5 is shown looped around these standards which are provided with air exit holes as shown at 15 in FIG. 5. The normal position when the opaque section 6 is in observation position is as shown in FIGS. 1, 3, and 4, but when the standards 14 are moved to the rear, the screen will take the position shown by the phantom lines 18 in FIG. 3.

Figure 3:
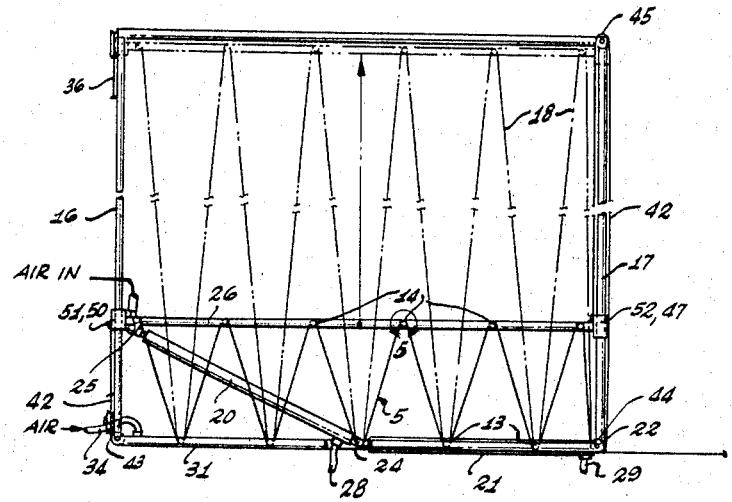
FIG. 3 is a plan view of the storage section of the system embodying the invention.
Figure 4:
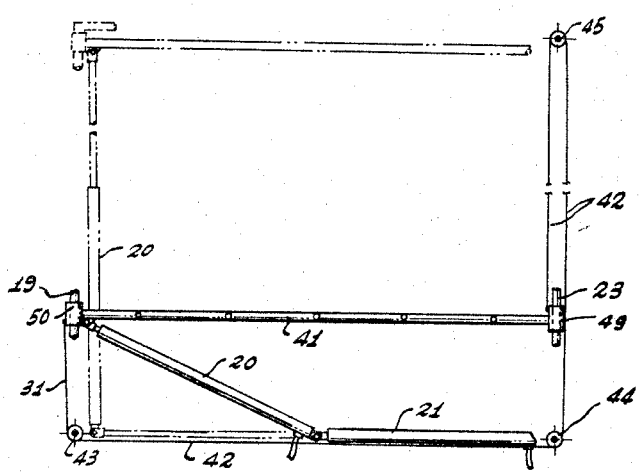
FIG. 4 is a detail view of the mechanism for rapidly removing the screen to storage position.

The standards 14 are moved from their normal position shown in FIG. 3 to the position shown by the phantom lines 18 in FIG. 3 by a pair of either air or hydraulic cylinders 20 and 21, cylinder 21 having its end 22 fixed, and the piston of cylinder 21 having its end 24 attached to the cylinder 20 whose piston end 25 is attached to the cross member 41. As shown in the figures, air is simultaneously fed through pipes or hoses 28 and 29 to the ends of the cylinders so that the array of standards 14 is rapidly moved away from the cross member 31. The cross members 26 and 31 are pipes connected to the upper ends of the standards so that when air is fed to these cross members by pipes or hoses 33 and 34, the screen will be removed from contact with the tubular standards. Thus, when air is simultaneously applied to the cylinders 20 and 21 and to the cross members 26 and 31, the screen will be rapidly fed into the cabinet 12 on air bearings.

Figure 6:
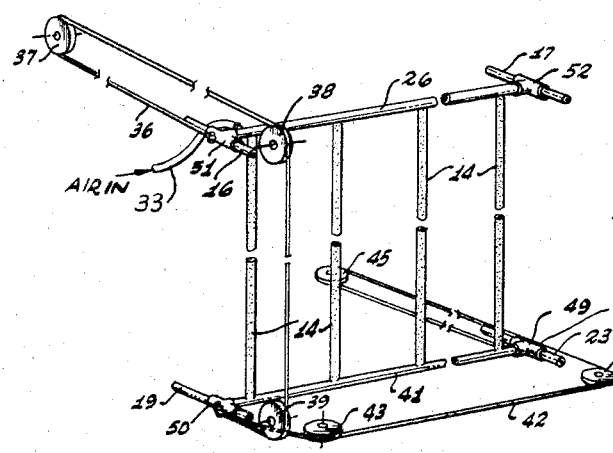
FIG. 6 is a perspective view of the mechanism for obtaining parallelism of the moving standards with the fix standards.

Since only one end of the cross-member 41 has an actuating force applied thereto, a parallel cord system, shown in FIG. 6, is employed. That is, as the array of standards 14 is connected to the piston end of the cylinder 20 and activated, the cord system, comprising a cord 36 attached to pipe 26, is wrapped around pulleys 37, 38, and connected to pipe 41. Connected to the lower pipe 41 of the standards 14 is a cord 42 which is attached to the end of the cross member 41 and is wrapped around a pulley 43, a pulley 44, and a rear pulley 45, the end of the cable 42 being attached to the other end 47 of the cross member 41. Thus, when the end of the cross member 41 is slid along the longitudinal members 16, 17, 19, and 23 on T connections 49, 50, 51, and 52, the other three ends of the array will be simultaneously moved along with T member 50.

When the screen 5 is in the position shown in FIGS. 1 and 3, the other end of the screen is wrapped around a stationary standard 54 having recessed ends 56 and 57 which are driven reels and which are of sufficient depth to accommodate the glass bands 10 and 11. This standard is particularly designed for a screen having no material in the section 8 and when the reels are energized by a motor 59, as will be explained hereinafter, the bands 10 and 11 will bring the diameter of the reels up to the surface of the standard 54 at the time the edge 60 reaches the standard 54. Thus, section 6 is replaced at observation position as the screen 5 is fed from the cabinet 12. If section 8 of the screen is of transparent material, reels of the same diameter as standard 54 can be used.

The above-described mechanism is controlled in a manner to remove the opaque section 6 from observation position and to place the section 8 in the former position of section 6, and also to more slowly move the screen in the same manner so that a transmergence is obtained from the opaque section 6 to the clear section 8 for certain types of transitions. Also, the return of the screen so that the opaque section 6 is in observation position is obtained.

Although in the following description of FIG. 7, certain switches are shown as manually operated, it is understood that a common power source could be applied, separate power sources being shown for sake of clarity in explanation. Referring, now, to FIG. 7, the screen 5 is shown passing around the standards 13 and 14 shown with the cylinders 20 and 21. In this figure, a motion picture projector 56' is shown in front of the screen 5, the projector including a film 57', a motor 58, and a projection lamp 59'. A pair of contacts 61 is shown which will short-circuit a circuit from ground 62 over conductor 63, manual switch 64, solenoid 65 to the positive side of battery 66 or other suitable power source to ground 67. When this circuit is shorted, solenoid 65 is energized and a pair of contacts 70 is opened which will break the energizing circuit from battery 66 over conductor 71 to ground 72. The contacts 61 may be shorted in any well known manner, such as by a metal conducting strip on the film.

In the left hand portion of FIG. 7 is shown an air compressor and motor combination 74 which has an air pipe 75 connected to the cross members 26 and 31 which feed the standard arrays 13 and 14. Also shown in this section of the drawing is a motor compressor combination 77 which supplies air or fluid to a double acting relay 78 which feeds lines 28 and 29 connected to the cylinders 20 and 21.

The motors of units 74 and 77 are energized over conductors 80 and 125 through contacts 81 and contacts 83 when closed from an energy supply 82. The contacts 81 and 83 are closed by the energization of a solenoid 84.

The stage lights represented by lamps 86 are energized over conductors 87 from a power source 88 when contacts 90 are closed, these contacts being normally open. A solenoid 91 actuates these contacts. The standard 54 is rotated by a motor 59 energized from an energy source 94 when a manual switch 95 is closed. The motor rotates reels 56 and 57 through a slip clutch 97, the clutch being tightened when contacts 98 are closed, the clutch being energized from a source 100. Solenoid 101 opens the contacts 98 which are normally closed.

Referring again to the left hand portion of the drawing, the relay 78 is of the type which can vary the amount of air or fluid from the compressor unit 77 to the air lines 28 and 29 so that two air or fluid pressures are provided. Manual switch 105, which when thrown to the left will energize the coil 106 over energy source 107, provides the larger of two openings between the compressor and air lines 28 and 29. When switch 105 is thrown to the right, the coil 109 will, when energized from the source 110, provide a smaller opening between the compressor and air or fluid lines. In this manner, two different speeds of removal of the screen from opaque to clear is provided, the switch 105 being manually preset according to the action desired. This also may be accomplished by a film switch.

A circuit including conductors 112 from the negative side of battery 66 energizes the solenoid 84, solenoid 91, and solenoid 101 over return conductor 113 to the positive side of battery 66. Thus, when the contacts 115 are closed, these three solenoids will be energized. Since the metallic strip on the film is of a practical length, the contacts 61 will be broken shortly after they are made. To maintain the solenoid 65 energized, a holding circuit over conductor 116, contacts 118 when closed, switch 64, solenoid 65, and battery 66 will hold the contacts 70 open and contacts 115 and 118 closed.

The operation of the system as above described is as follows: assuming the script calls for the rapid removal or snap action of the screen 5 from opaque position 6 to clear position 8, the manual switch 105 will be thrown to the fast screen moving position if the script calls for it, and the motor 59 will be energized. During this period, a picture may be projected on the section 6 of the screen 5. When the contacts 61 become short circuited, solenoid 65 is actuated to open contacts 70 and close contacts 115 and 118, contacts 118 locking solenoid 65 in energized condition. The closing of contacts 115 actuates solenoid 84 and energizes the motors of units 74 and 77, the energizing circuits being described above, to provide air to the standards 13 and 14, to the hydraulic cylinders 20 and 21 and to standard 54 over pipe or hose 68. The motor circuit for combination 74 is over contacts 83, conductors 125, and microswitches 126 and 127 which are normally closed. Simultaneously, the solenoid 91 will be energized to close the energizing circuit for the lamps 86, and, simultaneously, the solenoid 101 will be energized to release the clutch and remove the motor from the standard 54. The screen will then be rapidly fed into the cabinet 12 as explained above.

In order to re-energize the clutch so that the screen is held taut by the bands 10 and 11, a microswitch 120, which is normally open, is closed by the movement of the standard array 14 which will short the open contacts 98 over conductors 121 so that the motor, which continues to run, will maintain the proper tautness of the screen.

If it is desired to move the screen more slowly from the opaque observation position to the clear position, the manual switch 105 is thrown to the slow position which provides a smaller aperture between the compressor and air or fluid lines 28 and 29, which in turn provides the desired slower removal of the opaque section and creates the transmergence mentioned above. Since the standard 54 is fixed and only reels 56 and 57 rotate, the standard 54 has holes such as shown at 55 completely around it while standards 13 and 14 have holes only partially around them as shown in FIG. 5.

To return the screen from the clear section to the opaque section, the manual switch 64 is actuated which will break the holding circuit 116 to close the motor and lamp projector energizing circuit over contacts 70 and will de-energize solenoids 84, 91, and 101 which will de-energize the motor of unit 77, extinguish the lamps 86 and will restore the clutch to its driving position. The solenoid 84 has a third set of contacts 123 which are closed when solenoid 84 is de-energized. This connects power source 82 to the motor of unit 74 if microswitch 126 is closed. The switch 126 is opened when the array of standards 14 are in their rear position to eliminate air to the standards when the screen is stationary. However, when this array is moved forward, the motor is energized to provide the air bearing action to the standards 13, 14, and 54. However, the motor of unit 77 will remain de-energized so that the speed of the return of the screen on the standard 54 will be tensioned by the flow of air or hydraulic fluid back to the compressor unit 77. At the same time, the motor of unit 74 will remain energized to supply air to the standards so that during any movement of the screen around the standards, air bearings will be provided.

In series with microswitch 126, which is opened when the array of standards 14 is in its rear position, is a microswitch 127 which is opened when the array is in its forward position to de-energize the air bearing motor. Other microswitches may be used to de-energize the motor 59 or other energizing circuits of any well known types.

With the above system, a quiet, variable high speed screen removal method and system are provided to accomplish many new results.

I claim:

1. A method of rapidly moving one end portion of an elongate screen in the longitudinal edgewise direction from one position to another comprising threading the opposite end portion of said screen around a plurality of groups of supporting standards, each containing a plurality of standards, one group of which is fixed and another group of which is movable, securing the extremity of said screen adjacent said standard groups to one standard group, supplying air to openings in the standards between the standards and the screen, and simultaneously moving the movable standard group toward and away from the fixed standard group while supporting said one end portion of said screen for movement in the longitudinal edgewise direction.

2. A method in accordance with claim 1 in which said one screen end portion is normally restrained against edgewise movement in the direction of said standard groups and is released during the movement of the group of movable standards to move said one end portion in said direction to a given position and restrained against movement in said direction when said one screen end portion is in said given position.

3. A retractable projection screen system comprising a projection viewing screen having longitudinally spaced sections of uniform and varying opacity, respectively, a pair of standard arrays containing parallel standards, one array being fixed and the other array being movable toward and away from said first fixed array, one end portion of said screen extending from said arrays and the other end portion of said screen being trained about said standards and secured to one array in such manner that movement of said movable array away from said fixed array moves said one screen end portion in one longitudinal edgewise direction, take-up means supporting said one screen end portion for longitudinal edgewise movement and moving said one end portion in the opposite longitudinal edgewise direction upon movement of said movable array toward said fixed array, and means for supplying air to said standards to maintain a separation between said standards and said screen during movement of said screen.

4. A system in accordance with claim 3 including means for controlling the speed of longitudinal edgewise movement of said one screen end portion.

5. A system in accordance with claim 3 including a projector for projecting an image on said screen, and means controlled by said projector for initiating movement of said screen.

6. A system in accordance with claim 3 in which said take-up means comprise a single standard spaced from said standard arrays, and power means for winding said screen on and releasing said screen for unwinding from said single standard.

7. A system in accordance with claim 6 wherein said screen has bands secured to the longitudinal edges thereof and extending beyond the end of said one screen end portion, and said power means comprise reels at the ends of said single standard secured to said bands, respectively, and a motor for rotating said reels.

8. A system in accordance with claim 7 including a slip clutch between said motor and said reels.

9. A system for presenting live and film scenes on a stage comprising an elongate viewing screen having longitudinally spaced opaque and see-through sections along one end portion thereof, a projector for projecting a scene on said screen, lamps for illuminating a live scene on said stage behind said screen, a pair of front and rear standard arrays containing vertical standards, the front array being fixed and the rear array being movable toward and away from said fixed array, the other end portion of said screen passing around the front side of said standards in said fixed array and around the rear side of said standards in said movable array, the extremity of said screen adjacent said arrays being attached to said fixed array, a single standard spaced from said arrays having the other extremity of said screen attached thereto, means for supplying air to said standards, said standards being perforated over the surface thereof in contact with said screen, means for supplying air to said standards to separate said screen from said standards, and means for winding said one screen end portion on said single standard to move said one end portion in one longitudinal edgewise direction to a first position wherein one of said screen sections is located in front of said projector, said screen movement causing movement of said movable array toward said fixed array, and means for moving said movable array away from said fixed array while releasing said one end portion for unwinding from said single standard to move said one screen end portion in the opposite longitudinal edgewise direction to a position wherein the other screen section is located in front of said projector.

10. A system in accordance with claim 9 in which means are provided in said projector to stop said projector, to actuate said movable array and to energize said lamps.

11. A system in accordance with claim 10 in which manual means are provided for starting said projector, de-energizing said lamps and winding said screen on said single standard.

References Cited

UNITED STATES PATENTS

| | | | |
|---|---|---|---|
| 563,334 | 7/1896 | Tucker | 272—10 |
| 2,840,659 | 6/1958 | Cooley | 200—61.14 X |
| 3,075,679 | 1/1963 | Wadey | 242—55.12 |
| 3,112,473 | 11/1963 | Wicklund et al. | 266—118 X |
| 3,186,326 | 6/1965 | Schmidt | 226—97 X |
| 3,219,289 | 11/1965 | Alexeff et al. | 242—55.01 |
| 3,259,386 | 7/1966 | Rush | 272—10 |
| 3,278,100 | 10/1966 | Hornberger | 226—118 X |

ANTON O. OECHSLE, *Primary Examiner.*

ARNOLD W. KRAMER, *Assistant Examiner.*

U.S. Cl. X.R.

226—97, 118; 242—55.01